United States Patent [19]

Nakagawa et al.

[11] Patent Number: 4,737,653
[45] Date of Patent: Apr. 12, 1988

[54] IMAGE SENSOR WITH AUXILIARY LIGHT SOURCE

[75] Inventors: Katsumi Nakagawa, Kawasaki; Shinichi Seito, Isehara; Katsunori Hatanaka; Toshiyuki Komatsu, both of Yokohama, all of Japan

[73] Assignee: Canon Kabushiki Kaisha, Tokyo, Japan

[21] Appl. No.: 850,526

[22] Filed: Apr. 11, 1986

[30] Foreign Application Priority Data

Apr. 24, 1985 [JP] Japan ................................ 60-86215

[51] Int. Cl.$^4$ ............................................. H01J 40/14
[52] U.S. Cl. .................................... 250/578; 250/552; 358/293
[58] Field of Search ............... 250/578, 211 J, 211 R, 250/552; 357/30 K, 30 J, 30 R; 358/293, 294, 211, 221, 219

[56] References Cited

U.S. PATENT DOCUMENTS

| 3,430,050 | 2/1969 | Grimmeiss | 250/552 |
| 4,482,804 | 11/1984 | Oritsuki et al. | 250/211 J |
| 4,680,644 | 7/1987 | Shirato | 358/294 |

Primary Examiner—David C. Nelms
Assistant Examiner—Jessica L. Ruoff
Attorney, Agent, or Firm—Fitzpatrick, Cella Harper & Scinto

[57] ABSTRACT

An image sensor comprising at least one first light emitting element for irradiating an original with light, at least one photoconductive element for sensing the light via the original and at least one second light emitting element for irradiating the photoconductive element with light. The second light emitting element emits light of photoenergy smaller than the optical band gap of the photoconductive element.

5 Claims, 4 Drawing Sheets (a)

(b)

(c)

IMAGE SENSOR WITH AUXILIARY LIGHT SOURCE

BACKGROUND OF THE INVENTION

1. Field of the Invention

The present invention relates to an image sensor and more particularly to an image sensor which includes one or a plurality of first light emitting elements for irradiating an original with light, one or a plurality of photoconductive elements for sensing light via the original, and one or a plurality of second light emitting elements for irradiating the photoconductive elements with light.

2. Related Background Art

Recently, with the advance of electronic technology, the use of various image transmission and/or processing apparatus is becoming widespread. A device which converts an image in an original into an electric signal, namely, an image sensor, is indispensable for apparatus of this type. Usually, an image sensor is composed of photoelectric conversion elements which each convert an optical signal to an electric signal, a source of light for illuminating the original and an optical system, inclusive of non-imaging elements, for guiding the reflected light from the original to photoelectric conversion elements. As a photoelectric conversion elements, a charge coupled device (CCD) is often used. Although the CCD as such is of the miniature type, the optical system is a reducing optical system which is composed of large parts such as a mirrow and lenses. Thus these parts are an obstacle to miniaturization of the entire device. Thus, so-called contact type image sensors are being developed and are becoming widespread which include a photoelectric conversion element made of amorphous semiconductor such as amorphous silicon (a-Si), CdSe-CdSe, an array of LEDs and an imaging light converging element (trade name: SELFOC manufactured by Nihon Sheet Glass). Photoelectric conversion elements using amorphous semiconductors are classified into the photoconductive type, which permits injection of charge carriers out of the electrodes, and the photodiode type, which does not permit carrier injection. Generally, the photoconductive type provides high conversion efficiency and hence a large output signal, thereby resulting in a high-quality image signal. However, it shows slow response to changes in the optical input and has been considered to be unsuitable for high-speed operation. In order to compensate for the above drawback of the photoconductive type photoelectric conversion elements, a method called bias light irradiation is known. FIG. 1 shows one example of an image sensor using bias light irradiation. Herein, reference numeral 1 denotes a transparent insulative substrate; reference numeral 2, an amorphous semiconductor layer deposited on the substrate; reference numeral 3, opposing electrodes. A highly doped layer for carrier injection may be provided, as needed, between the opposing electrodes 3 and semiconductor layer 2. Semiconductor layer 2 and electrodes 3 constitute a photoconductive element. Reference numeral 4 denotes an IC for processing electric signals. A document 5 is irradiated with light by an array of LEDs 6. The reflected light from the original is caused to enter semiconductor 2 between opposing electrodes 3 by an imaging light converging element 7. It is arranged that the light from another array of LEDs 8 directly enters semiconductor layer 2. That is, the reflected light from the original and the light from the array of LEDs 8 enter semiconductor 2, which is referred to as bias light irradiation.

The effect of the conventional image sensor having the above structure and using bias light irradiation will now be described with respect to the waveforms of FIG. 2. Assume that original 5 is covered with alternate white and black stripes and that the document is fed in a given direction. FIG. 2(a) shows the intensity of the reflected light from the document in which reference numeral 201 denotes the light intensity obtained when the white stripe is being read and reference numeral 202 the light intensity obtained when the black stripe is being read. FIG. 2(b) shows a change in the photocurrent flowing out of the photoconductive elements when only the array of LEDs 6 is emitting light. FIG. 2(c) shows a change in the photocurrent flowing out of one of the photoconductive element when both arrays 6 and 8 are emitting light at the same time. It can be seen from FIGS. 2(b) and (c) that lighting of array 8 will expedite the response of a change in the photocurrent. Thus the original can be moved and read at higher speeds than otherwise.

It should be noted that in bias light irradiation, a photocurrent component 204 is contained in photocurrent 203, as shown in FIG. 2(c). If the photocurrent value is directly proportional to the intensity of the light reflected from document 5, a true photocurrent value will be obtained by subtracting photocurrent component 204 from photocurrent 203. However, the photocurrent value is not necessarily directly proportional to the intensity of the light reflected from the document. In order to obtain a correct photocurrent value, the bias light must be weakened and the response of the photoconductive elements cannot be speeded up sufficiently.

SUMMARY OF THE INVENTION

It is an object of the present invention to provide an image sensor which solves the prior art problems.

It is another object of the present invention to provide an image sensor which obtains a correct photocurrent and provides for capable of high-speed response.

According to the present invention, this is done by providing an image sensor which includes at least one first light emitting element for irradiating a original with light, at least one photoconductive element for sensing light via the document, and at least one second light emitting element for irradiating the photoconductive element with light, said second light emitting element being a light emitting element which emits light of photoenergy smaller than the optical band gap of said photoconductive element.

BRIEF DESCRIPTION OF THE DRAWINGS

FIG. 2(a) is a waveform showing the intensity of the reflected light from a document; FIG. 2(b) the waveform of the photocurrent flowing out of a photoconductive element using no bias light irradiation; and FIG. 2(c) the waveform of the photocurrent flowing out of a photoconductive element using bias light irradiation.

FIG. 3(a) a band diagram obtained immediately after irradiation of the reflected light from the document without using bias light irradiation; FIG. 3(b) a band diagram obtained immediately after disappearance of the reflected light from the document without using bias light irradiation; and FIG. 3(c) a band diagram obtained by using bias light irradiation.

FIG. 5(b) the waveform of a photocurrent flowing out of a photoconductive element.

DETAILED DESCRIPTION OF THE PREFERRED EMBODIMENTS

The embodiments of the present invention will be described in more detail with respect to the drawings.

Figure 3:
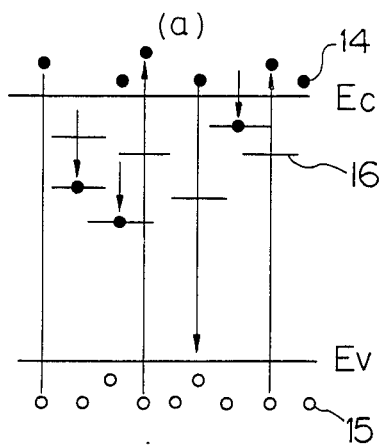
FIG. 3 is a band diagram used for explaining the principle of the conventional image sensor.
Figure 3:
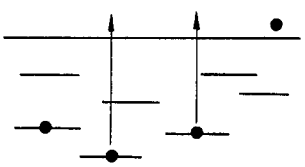
Figure 3:
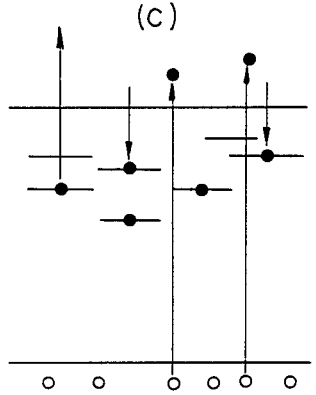

First, the principle of bias light irradiation will be described with respect to the drawings. FIG. 3 schematically shows the state of band gaps (more correctly, mobility gaps) of an amorphous semiconductor in which reference numerals 14, 15 and 16 denote an electron, a hole and a localized level forming a trap for an electron, respectively. Reference characters Ec and Ev denote the energy at the bottom of the conduction-band and the energy at the top of the valence-band respectively. FIG. 3(a) is a band diagram obtained immediately after irradiation of the light reflected from the document without bias light irradiation, and shows that electrons and holes are excited to the conduction and valance bands, respectively. Since, however, most of the excited electrons falls into traps 16, it takes much time for the density of electrons in the conduction band to increase. If the mobility of a hole is sufficiently low compared with that of an electron in an amorphous semiconductor, photocurrent will continue to increase until electrons fill the traps sufficiently. FIG. 3(b) is a band diagram obtained immediately after disappearance of irradiation of the light from the document without bias light irradiation, and shows that since the electrons remaining in the traps come sequentially out of the traps, the photocurrent will not immediately be nullified. FIG. 3(c) is a band diagram obtained during bias light irradiation, and shows that electrons are present at all times in a considerable proportion of the traps. Some of the electrons in the traps will be excited to the conduction band. Thus, if light from the document enters, a rise in the photocurrent will be rapid because there are few empty traps. A fall in the photocurrent will also be rapid after disappearance of light irradiation because electrons are present at all times in part of the traps. However, some photocurrent will flow at all times even in the absence of incidence of the light reflected from the document.

The principle of the image sensor according to the present invention will be described with respect to FIG. 4.

Figure 4:
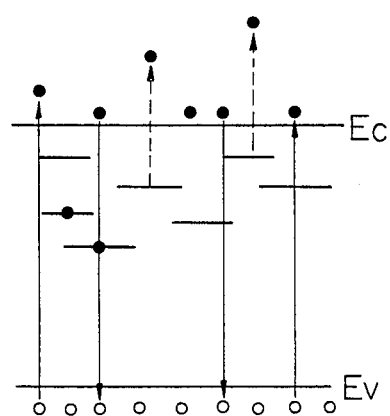
FIG. 4 is a band diagram used for illustrating the principle of an image sensor using bias light irradiation according to the present invention.
Figure 2:
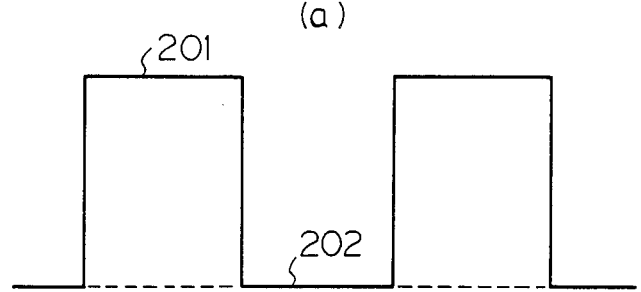
FIG. 2 illustrates the effect of a conventional image sensor using bias light irradiation; specifically
Figure 2:
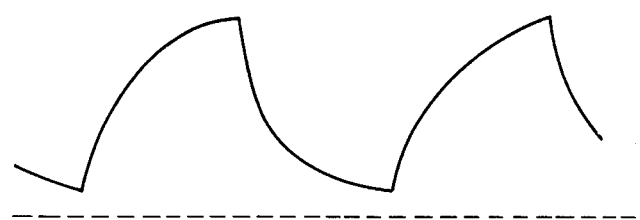
Figure 2:
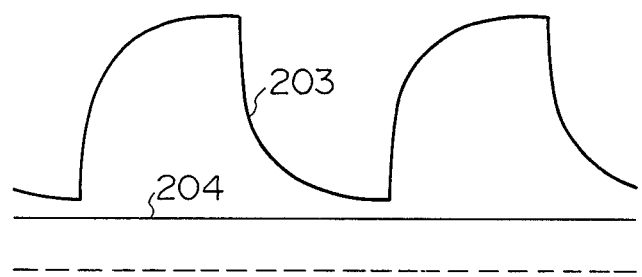

FIG. 4 is a band diagram in which the photon energy of bias light is smaller than the optical band gap, and bias light cannot excite electrons from the valence band to the conduction band. Consequently, bias light alone does not cause photocurrent to flow. Since electrons are excited from the traps to the conduction band, the time for which electrons stay in the traps is short and the density of electrons will arrive at a constant value in a shorter time after the beginning of light irradiation. On the other hand, photocurrent will be damped in a shorter time after light irradiation is stopped. Thus, it is desirable to use, as bias light, light in which the photon energy is smaller than the optical band gap, namely, light having a longer wavelength.

An image sensor according to the present invention will be described using its preferred embodiments.

EXAMPLE 1

Figure 1:
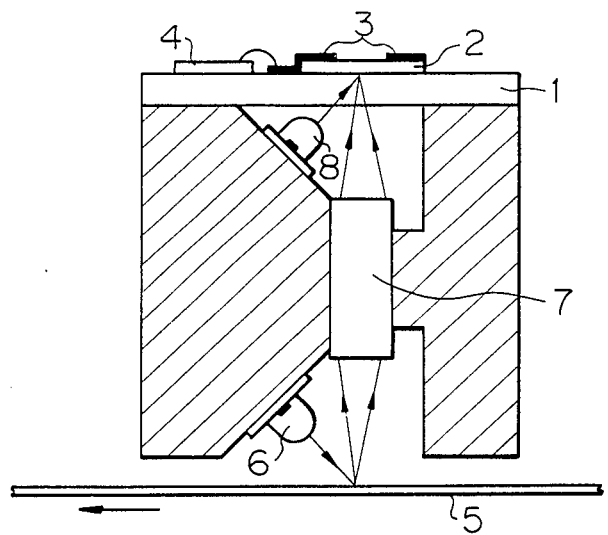
FIG. 1 is a cross-sectional view of an example of an image sensor using bias light irradiation.

The image sensor according to the present invention has the same structure as that of FIG. 1. A 0.8-μ amorphous silicon (a-Si) film was formed on a transparent insulative substrate (Corning #7059) 1 by decomposition of 0.1-Torr monosilane (SiH$_4$) gas at glow discharge of 10-watt discharge power and a high-frequency (13.56 MHz) voltage.

A p-doped 0.1-μ n$^+$ layer was then formed on the (a-Si) film at discharge in the flow of a gas of mixtured SiH$_4$ and about 5,000 ppm phosphine (PH$_3$). Aluminum was deposited on the n$^+$ layer by vacuum evaporation. Thereafter, electrodes were formed by patterning of the aluminum using ordinary photolithographic process. The n$^+$ layer portions between the electrodes were then removed by dry etching.

In this example, the center light-emitting wavelength of LED array 6 was set to 555 nm (green light) and that of LED array 8 likewise to 890 nm (near-infrared radiation). The optical band gap of the a-Si film used in the particular example was 1.7 eV (corresponding to optical energy having a 730 nm wavelength), so that the light from LED array 6 is larger in energy than the optical band gap while the light from LED array 8 is smaller in energy than the optical band gap.

Figure 5:
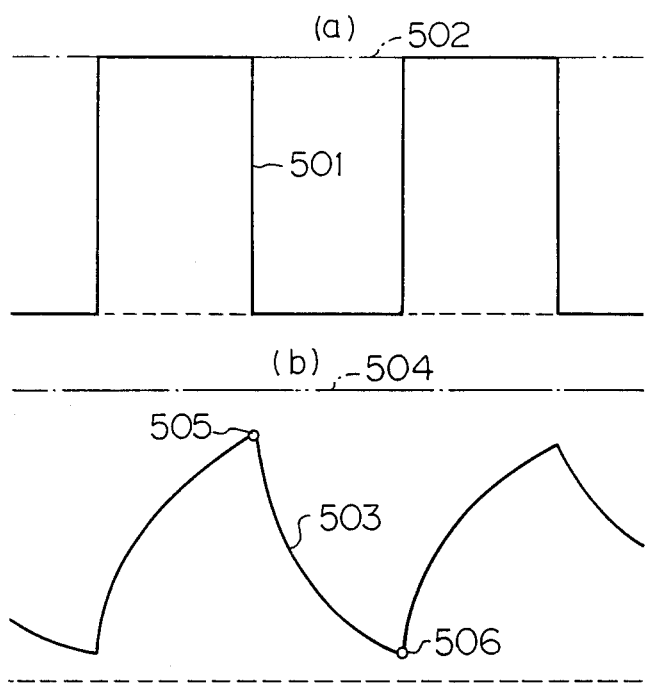
FIG. 5 illustrates the effect of an image sensor using bias light irradiation according to the present invention; specifically, FIG. 5(a) a waveform showing the intensity of the reflected light from a document.

In order to know the effect of bias light irradiation, a white paper sheet was used as a document, LED array 6 was turned on and off and changes in the photocurrent at that time were examined. In FIG. 5(a), reference numeral 501 denotes a waveform showing the intensity of irradiation light from the document, the duty cycle being 50%; reference numeral 502, the intensity of the irradiation light obtained when LED array 6 was continuously emitting light. FIG. 5(b) shows the waveform of the photocurrent flowing through a photoconductive element due to the irradiation light shown in FIG. 5(a). In FIG. 5(b), reference numeral 503 denotes a photocurrent corresponding to the irradiation light intensity 501, reference numeral 504 a photocurrent corresponding to the irradiation light intensity 502. In the particular example, the frequency for 501 and the illuminance for 501 obtained when the LEDs were emitting light were set to 100 H$_z$ and 100 l$_x$, respectively. Assume that the value of the photocurrent 504 obtained when the LEDs are continuously emitting light is I$_1$ and that the maximum and minimum values 505 and 506 of the photocurrent 503 obtained when the LEDs are turned on and off are I$_2$ and I$_3$, respectively. The respective photocurrents I$_1$, I$_2$ and I$_3$ were measured in a non-bias light state, in a state where bias light was 50 μW/cm$^2$ at the surfaces of the photoconductive elements, and in a state where bias light was likewise 500 μW/cm$^2$. The results of this measurement are shown in Table 1 below.

TABLE 1

|  | non-bias light | bias light of 50 $\mu$W/cm$^2$ | bias light of 500 $\mu$W/cm$^2$ |
| --- | --- | --- | --- |
| steady-state value (I$_1$) | 200 nA | 190 nA | 150 nA |
| maximum value (I$_2$) | 170 nA | 170 nA | 140 nA |
| minimum value (I$_3$) | 50 nA | 30 nA | 15 nA |

It can be seen from these results that as the illuminance of the bias light increases, the response to changes in light is improved.

EXAMPLE 2

Figure 6:
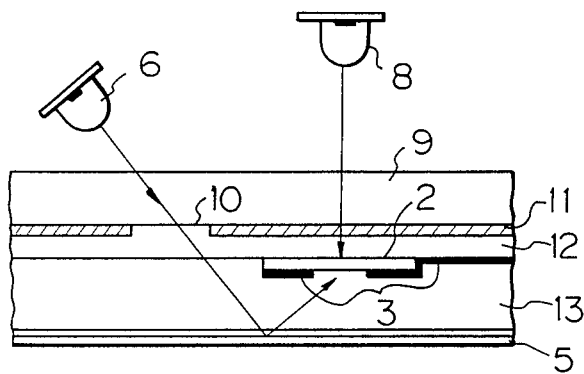
FIG. 6 is a cross-sectional view of another embodiment of an image sensor using bias light irradiation according to the present invention.

Another example of the image sensor according to the present invention is shown in FIG. 6. The same reference numerals used in FIGS. 6 and 1 identify similar elements.

In FIG. 6, a light shielding layer 11 with a window or slit 10 is provided on substrate glass 9. Layer 11 is made of a material, such as a-Si, a-Ge or a-Si$_x$Ge$_{1-x}$, which can transmit light having a long wavelength therethrough. A transparent insulative layer 12 is formed on layer 11. Each photoconductive element is made of an amorphous semiconductor layer 2 and opposing electrodes 3. A high-density doped layer may be formed between layer 2 and electrodes 3 as needed. A transparent anti-abrasive layer 13 is further provided on the photoconductive elements. LED array 6 irradiates document 5 through window 10 with light having photon energy larger than the optical band gap for amorphous semiconductor 2. The reflected light from document 5 enters the photoconductive elements. On the other hand, the light from LED array 8, the photon energy of which is smaller than the optical band gap of layer 2, passes through shielding layer 11, can directly illuminate the photoconductive elements, and can thereby be used as bias light. In the particular example, the response to light was highly improved by use of LED array 8 as in the example 1.

In the just mentioned image sensor according to the present embodiment signal light incident on the photoconductive elements was the reflection from the face of the document. However, it may be light transmitted through the document.

As described above in detail, according to the image sensors of the particular examples, any lost components of a bias photocurrent are nullified, a correct photocurrent from the document face is obtained, and high-speed response is possible.

What we claim is:

1. An image sensor comprising:
   at least one first light emitting element for irradiating an original with light;
   at least one photoconductive element for sensing the light from said first light emitting element via the original, said photoconductive element being positioned on a surface of a transparent insulating support at a side opposing the original and having a transparent protection layer at a side on which the light from said first light emitting element via said original is incident; and
   a second light emitting element for irradiating said photoconductive element solely with light having a photoenergy smaller than an optical band gap of of a semiconductor layer of said photoconductive element,
   said transparent insulating support having a light shielding layer cutting off the light from said first light emitting element but transmitting the light from said second light emitting element, and a slit through which the light from said first light emitting element can pass.

2. An image sensor according to claim 1, wherein said photoconductive element includes an amorphous semiconductor layer.

3. An image sensor according to claim 2, wherein said amorphous semiconductor layer is made of amorphous silicon.

4. An image sensor according to claim 1, wherein said first light emitting element is an array of LEDs.

5. An image sensor according to claim 1, wherein said second light emitting element is an array of LEDs.

* * * * *

UNITED STATES PATENT AND TRADEMARK OFFICE
CERTIFICATE OF CORRECTION

PATENT NO. : 4,737,653                     Page 1 of 2

DATED : April 12, 1988

INVENTOR(S) : KATSUMI NAKAGAWA, ET AL.

It is certified that error appears in the above-identified patent and that said Letters Patent is hereby corrected as shown below:       Title page:

AT [56] IN THE REFERENCES

Attorney, Agent, or Firm, "Fitzpatrick, Cella Harper & Scinto" should read --Fitzpatrick, Cella, Harper & Scinto--.

COLUMN 1

Line 27, "elements," should read --element,--.
Line 31, "mirrow" should read --mirror--.

COLUMN 2

Line 18, "element" should read --elements--.
Line 42, "capable of" should be deleted.
Line 45, "a" should read --an--.
Line 67, "sensor; FIG. 3(a) a" should read --sensor; specifically, FIG. 3(a) is a--.

COLUMN 3

Line 12, "FIG. 5(a) a" should read --FIG. 5(a) is a--.
Line 37, "valance" should read --valence--.
Line 57, "part" should read --some--.

COLUMN 4

Line 23, "mixtured" should read --mixed--.

UNITED STATES PATENT AND TRADEMARK OFFICE
CERTIFICATE OF CORRECTION

PATENT NO. : 4,737,653

DATED : April 12, 1988

INVENTOR(S) : KATSUMI NAKAGAWA, ET AL.

It is certified that error appears in the above-identified patent and that said Letters Patent is hereby corrected as shown below:

COLUMN 6

Line 23, "of" (first occurrence) should be deleted.

Signed and Sealed this

Sixth Day of September, 1988

Attest:

DONALD J. QUIGG

Attesting Officer

Commissioner of Patents and Trademarks